(12) United States Patent
Gutta

(10) Patent No.: US 9,930,393 B2
(45) Date of Patent: Mar. 27, 2018

(54) RECEIVING AUDIO/VIDEO CONTENT

(71) Applicant: Saturn Licensing LLC, New York, NY (US)

(72) Inventor: Sri Gopikanth Gutta, Basingstoke (GB)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 14/440,393

(22) PCT Filed: Dec. 20, 2013

(86) PCT No.: PCT/GB2013/053404
§ 371 (c)(1),
(2) Date: May 4, 2015

(87) PCT Pub. No.: WO2014/108667
PCT Pub. Date: Jul. 17, 2014

(65) Prior Publication Data
US 2015/0304702 A1   Oct. 22, 2015

(30) Foreign Application Priority Data

Jan. 14, 2013 (GB) .................................. 1300614.3

(51) Int. Cl.
*H04N 21/426* (2011.01)
*H04N 21/418* (2011.01)
(Continued)

(52) U.S. Cl.
CPC ..... *H04N 21/4263* (2013.01); *H04N 21/4181* (2013.01); *H04N 21/4302* (2013.01);
(Continued)

(58) Field of Classification Search
CPC ........... H04N 21/4263; H04N 21/4181; H04N 21/4344; H04N 21/4383
See application file for complete search history.

(56) References Cited

U.S. PATENT DOCUMENTS

| 6,058,242 A * | 5/2000 | Kim ....................... H04N 5/782 348/569 |
| 2003/0123657 A1 | 7/2003 | Bjordammen et al. |

(Continued)

FOREIGN PATENT DOCUMENTS

| KR | 1020080066195 | 7/2008 |
| WO | 02/41625 A1 | 5/2002 |

OTHER PUBLICATIONS

International Search Report dated Mar. 25, 2014 in PCT/GB2013/053404 filed Dec. 20, 2013.
(Continued)

*Primary Examiner* — Sumaiya A Chowdhury
(74) *Attorney, Agent, or Firm* — Oblon, McClelland, Maier & Neustadt, L.L.P.

(57) ABSTRACT

An audio/video content receiver decoding audio/video signals modulated onto transmission channels as transport streams, at least one transmission channel carrying non-viewing information. The content receiver includes a tuner arrangement for concurrently tuning to two or more transmission channels and a multiplexer configured to generate a composite signal from received audio/video signals of required programs for decoding. The content receiver further includes a content decoder for concurrently decoding two or more audio/video programs from the composite signal and a detector configured to detect whether one or more of the transmission channels tuned by the tuner arrangement are not currently in use for providing a program for decoding. Finally, the content receiver includes a controller that, responsive to detection that a transmission channel is not currently in use, controls the tuner to tune that channel to a transmission channel carrying a transport stream including non-viewing information.

20 Claims, 11 Drawing Sheets

(51) Int. Cl.
*H04N 21/43* (2011.01)
*H04N 21/434* (2011.01)
*H04N 21/436* (2011.01)
*H04N 21/4367* (2011.01)

(52) U.S. Cl.
CPC ..... *H04N 21/4307* (2013.01); *H04N 21/4344* (2013.01); *H04N 21/4348* (2013.01); *H04N 21/4367* (2013.01); *H04N 21/43607* (2013.01)

(56) References Cited

U.S. PATENT DOCUMENTS

| | | |
|---|---|---|
| 2005/0091697 A1* | 4/2005 | Tanaka .................. H04N 7/163 725/131 |
| 2005/0152546 A1 | 7/2005 | Kangas |
| 2006/0294574 A1 | 12/2006 | Cha |
| 2007/0074256 A1 | 3/2007 | Jung et al. |
| 2008/0192820 A1* | 8/2008 | Brooks .............. H04N 7/17318 375/240.02 |
| 2010/0175101 A1 | 7/2010 | Devictor et al. |
| 2012/0254618 A1 | 10/2012 | Moore |
| 2013/0177154 A1 | 7/2013 | Hill-Jowett et al. |
| 2014/0013115 A1 | 1/2014 | Hill-Jowett |
| 2014/0375892 A1 | 12/2014 | Hill-Jowett |
| 2015/0040155 A1 | 2/2015 | Gutta et al. |
| 2015/0058878 A1 | 2/2015 | Hill-Jowett |

OTHER PUBLICATIONS

Office Action issued in corresponding European Patent Application No. 13 812 042.3 dated Jun. 10, 2016.

\* cited by examiner

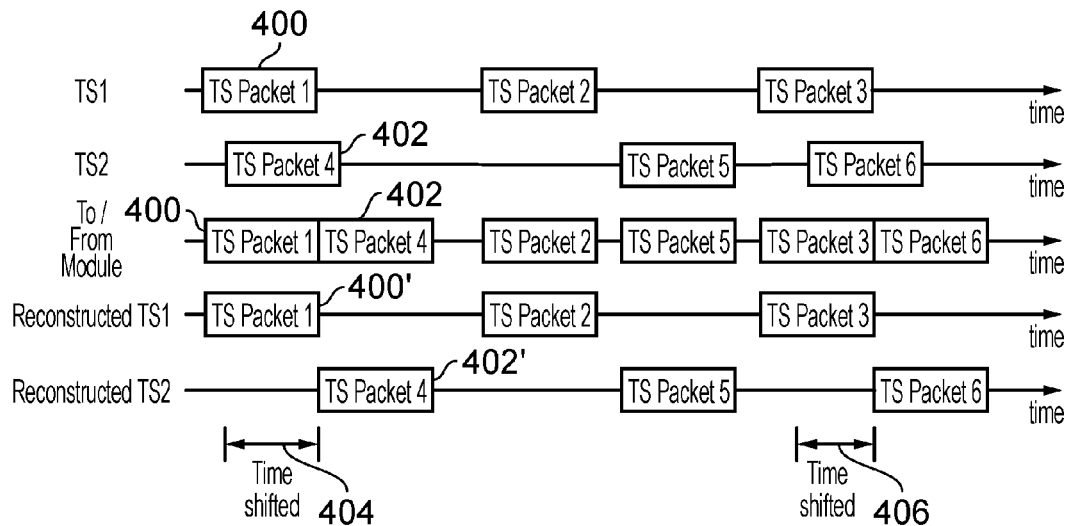
FIG. 16
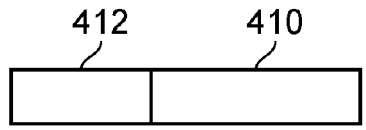
FIG. 17
| 420 | 422 | 424 | 426 | 428 |
|---|---|---|---|---|
| SEQUENCE NO. | PID | ARRIVAL TIME | SENT | RECD |
|  |  |  |  |  |
|  |  |  |  |  |
|  |  |  |  |  |
FIG. 18

RECEIVING AUDIO/VIDEO CONTENT

CROSS REFERENCE TO RELATED APPLICATIONS

The present application claims the benefit of the earlier filing date of GB1300614.3 filed in the United Kingdom Intellectual Property Office on 14 Jan. 2013, the entire contents of which application are incorporated herein by reference.

BACKGROUND

Field

This disclosure relates to receiving audio/video content.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, is neither expressly or impliedly admitted as prior art against the present disclosure.

As background technology, the DVB Common Interface ("CI") specification allowed a television receiver or set top box (a "host") to interact with a secure hardware module (a conditional access module or "CAM") to allow the host to decrypt access-controlled content. The CI specification defines an interface between the host and the CAM, so that the two will work together if both conform to the CI specification. This interoperability provided a significant benefit of the CI system, as, in principle, it allowed consumers a choice of compatible products from different manufacturers.

In the CI specification the CAM interacts with a smart card and/or a user's personal identification number ("PIN") to provide user authentication.

However, a disadvantage of the original CI specification is that it gave the potential for the decrypted digital content to be copied. This problem arises from the way in which the host and CAM interact. In use, the host sends encrypted data to the CAM. The CAM checks the user authentication and, assuming that the user is authenticated, it decrypts the access-controlled content. The CAM then sends the decrypted content back to the host over the CAM-host interface, which is generally a PCMCIA (Personal Computer Memory Card International Association) interface, though it is not limited to this interface—for example, a USB interface could be used. This connection from the CAM to the host represents a security weakness, in that the decrypted digital content can in principle be intercepted and unlawfully copied. This security weakness meant that some content providers preferred integrated devices, which have the host and CAM as a single unit, because this allowed them better security over the transfer of unencrypted data from the CAM to the host. However, this of course acted against the advantage associated with CI, relating to the potential interoperability of different CAMs and hosts.

The CI Plus specification was drafted to address these problems, by two main routes. CI Plus provides a secure interface between the CAM and the host, so that decrypted content data is not sent in clear form between the two devices. Also, CI Plus provides for the authentication of both the host and the CAM, rather than the CI technique of authenticating only the CAM.

The authentication system uses certificate hierarchy so that the host and the CAM must both have been issued certificates by an authority (such as CI Plus LLP).

The PCMCIA interface between a host and a CAM is protected by encrypting the decrypted content data before it is sent from the CAM to the host, and then decrypting it at the host. This encryption is separate to the access control encryption-decryption established by the content provider, and is specific to each particular CAM-host pair. Keys are exchanged between the CAM and host by the Diffie-Hellman key exchange technique. The keys are also cycled from time to time, so that even if a key was compromised, it would in any event be changed a few seconds later.

The CI Plus specification also allows CAMs to be connected in series, or daisy-chained.

SUMMARY

This disclosure provides an arrangement as defined in claim 1.

Various further respective aspects and features of the disclosure are defined in the appended claims.

It is to be understood that both the foregoing general description and the following detailed description are exemplary, but are not restrictive, of the present technology.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 16 schematically illustrates the multiplexing of two separate programme services;

FIG. 17 schematically illustrates a packet having an augmented packet header;

FIG. 18 schematically illustrates a packet timing data table;

DESCRIPTION OF THE EMBODIMENTS

To establish the technical context of the present embodiments, a broadcast system having a single tuner and decoder arrangement will first be described with reference to FIGS. 1 to 3.

Figure 1:
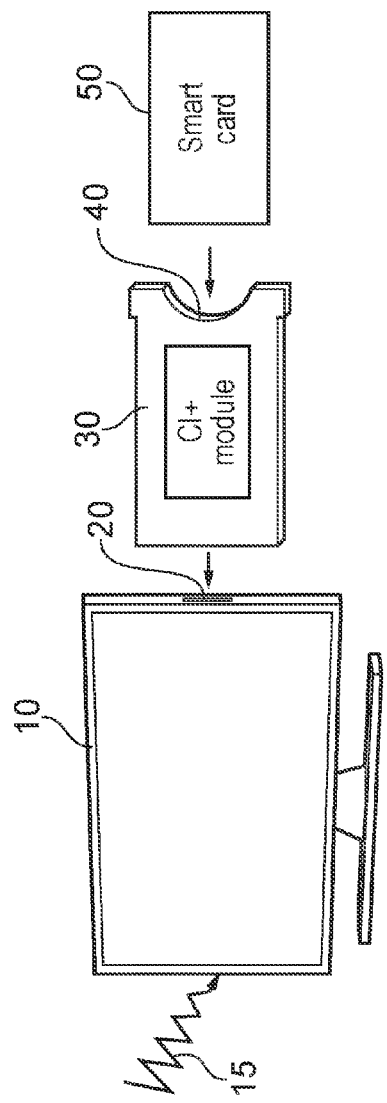
FIG. 1 is a schematic diagram of a host device with a CAM and a smart card.

Referring now to FIG. 1, a host device 10 is shown here as a television set but could be, for example, a set top box (noting that the expression "set top" does not imply, to the skilled person, any requirement for a particular physical position of the device in use). The host device 10 receives an access-controlled television signal 15 via a broadcast data path. This could be, for example, a satellite television signal received by a satellite dish (not shown), a terrestrial television signal, a cable television signal or the like, although other types of television signal include a television signal broadcast or transmitted by an internet protocol (IP) packet signal. One technique is to encode an MPEG transport stream (TS) into IP packets so that an IP packet carries a number (for example 7 or 8) TS packets. Another technique encodes the television signal as a so-called ISO (International Standards Organisation) BMFF (Base Media File Format) arrangement described in the reference: http://en.wikipedia.org/wiki/ISO_base_media_file_format, the contents of which are incorporated into the present description by reference. In such arrangements the IP interface at a host device is generally considered within the art as a "tuner" even though it may have no radio frequency circuitry or functionality. It does however act in a similar way to a radio frequency tuner in that it selects an IP stream from a multitude of possible IP streams. It may also provide buffering of the received IP stream.

The host device 10 has a PCMCIA slot 20 which includes electrical connections and a physical space for a plug-in module, both according to the PCMCIA standard. In other embodiments, a universal serial bus (USB) or other electrical interface can be used instead of the PCMCIA interface.

A CI Plus conditional access module, referred to as a CICAM 30, is a PCMCIA module which can be plugged into the PCMCIA slot 20. When the CICAM 30 is fully plugged into the slot 20, electrical connections are made between connectors on the CICAM 30 and cooperating connectors within the slot 20.

The CICAM itself may be a cardless module or may have a slot 40 into which a so-called smart card 50 may be inserted. The smart card is removable and carries information defining a current user of the content receiver in a tamper-proof, secure and non-volatile form. When the smart card is fully inserted in the slot 40, a data connection is formed between the smart card 50 and the CICAM 30, either by using cooperating electrical connectors on the smart card 50 and within the slot 40, or by using a known contactless connection technique in which data is transferred wirelessly over a very short range such as 1-2 cm.

Figure 2:
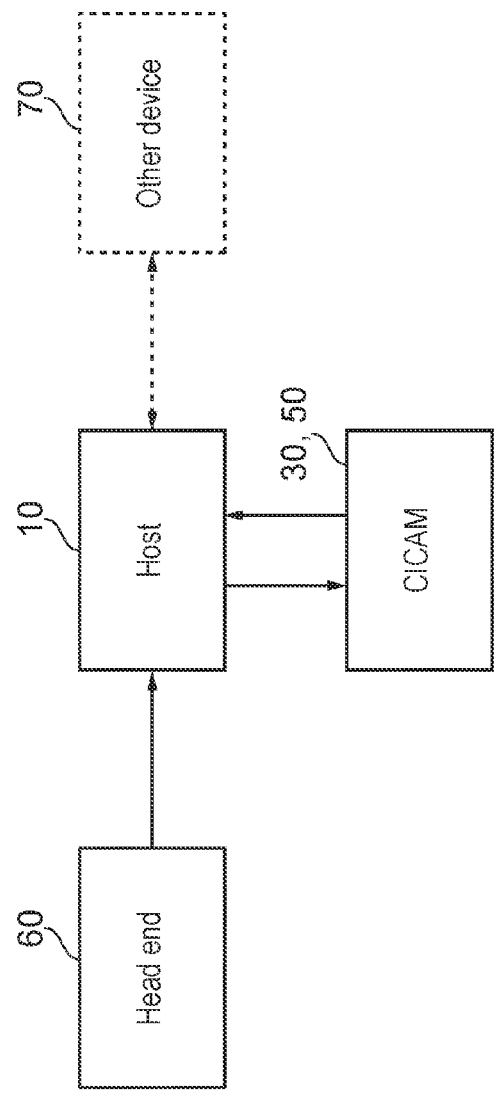
FIG. 2 is a schematic diagram of a conditional access (CA) system incorporating the host device of FIG. 1.

FIG. 2 schematically illustrates the host device 10 in the context of a conditional access system. A so-called head end 60 represents the source of the access-controlled television signal 15. The head end may represent, for example, an uplink station of a satellite broadcaster or a signal distribution centre of a terrestrial or cable broadcaster. The CA system scrambles content at the head end using a CA system encryption. The head end can also introduce other CA-related information into the encrypted data stream which enables the CICAM to descramble the content and to manage the subscriber's (user's) access and entitlements.

The head end 60 sends the television signal 15 to the host 10 which in turn passes the signal to the CICAM 30 for decryption of the access control encryption. The CICAM 30 then re-encrypts the signal using a local encryption and sends the re-encrypted signal back to the host 10 via the PCMCIA connection. The host decrypts the signal received from the CICAM 30 for display on a display screen or for supply to another device 70 such as a hard disk based video recorder.

Figure 3:
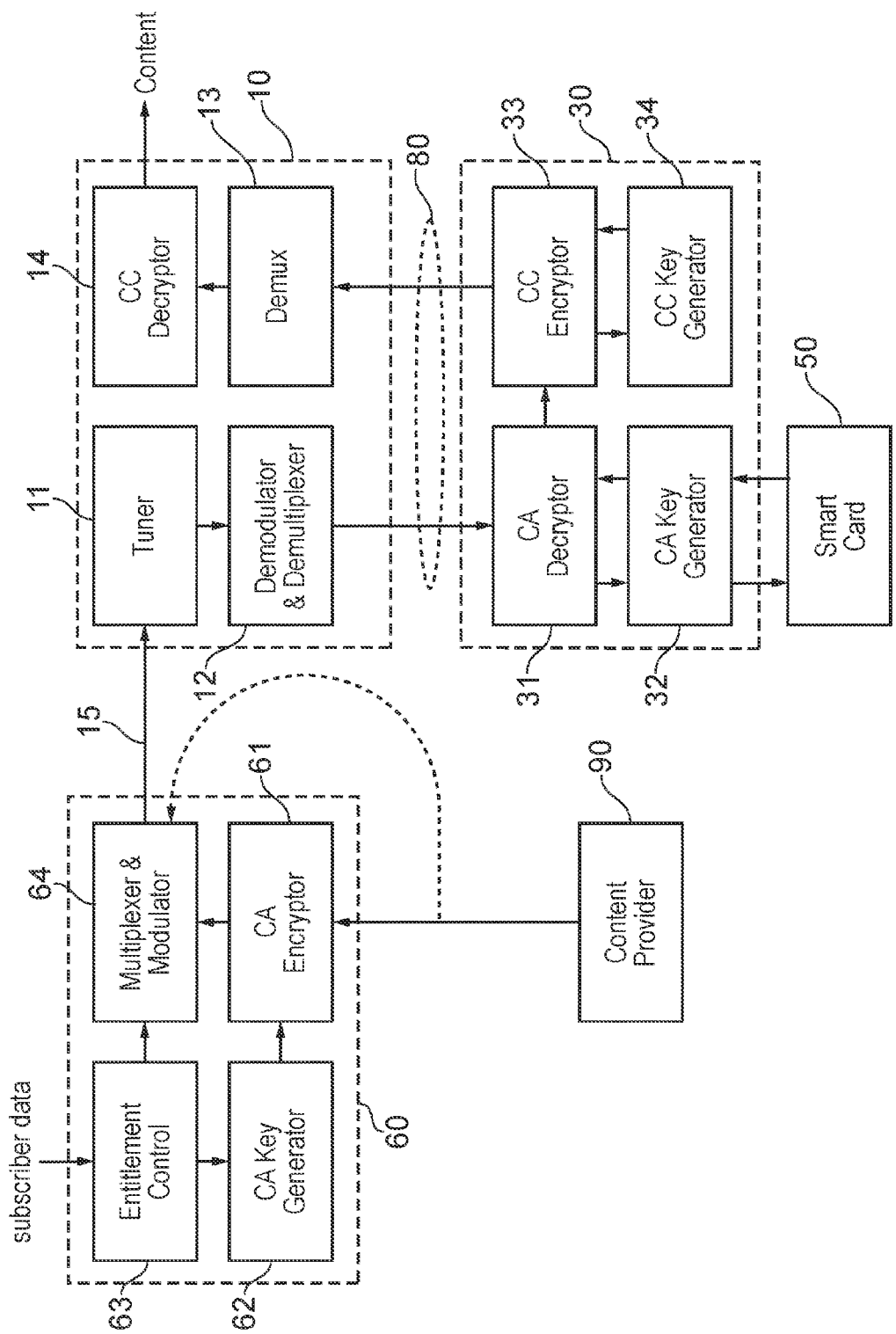
FIG. 3 is a schematic diagram illustrating the operation of the system of FIG. 2.

FIG. 3 is a schematic diagram illustrating the operation of the system of FIG. 2. The detailed operation of the system of FIG. 3 is described in the CI Plus Specification 1.3 (2010-01), available (at the time of filing) at http://www.ci-plus.com/data/ci-plus_specification_v1.3.pdf. This document is incorporated by reference into the present description. The present description of FIG. 3 simply provides an overview of that detailed operation, for the purposes of placing the subsequent description into the appropriate technical context.

As before, FIG. 3 shows the head end 60 (which receives a content signal from a content provider 90), the host device 10, the CICAM 30 and the smart card 50. The signal 15 is shown passing from the head end 60 to the host device 10. The secure interface 80 between the host device 10 and the CICAM 30 is referred to as the common interface.

Conditional Access

Known CA systems provide techniques by which a user can be denied or allowed access to a digital television stream. Access is provided only to those subscribers or users with valid payment accounts. In practical terms, a user is provided with a smart card 50 identifying that user in (ideally) a tamper-free way, and the system is set up so that only users with valid smart cards are able to obtain access to the access-controlled content.

Access control is provided by the use of scrambling and encryption. The content signal is scrambled with an 8-byte control word, which is changed frequently (up to several times per minute) to avoid the CA system being compromised by outside knowledge of the control word. The control words are transmitted to the receiver's CICAM, for descrambling of the scrambled content, in an encrypted form as an entitlement control message (ECM). The CICAM decrypts the control word to allow descrambling of the access-controlled content only when it is authorised to do so by receipt of an entitlement management message (EMM). EMMs are specific to each user or group of users; the CICAM confirms the rights which an EMM provides by comparing the user identification provided in the EMM with user information provided in the smart card 50. The EMMs can be sent less frequently than the ECMs, with intervals between successive EMMs in current commercial systems varying between 12 minutes and six weeks.

ECMs and EMMs themselves are well known message types in MPEG television distribution systems. The format of their payloads can be specific to the CA system in use, with the differences between formats often being semantic rather than having technical significance.

Head End

The head end 60 comprises a CA encryptor 61, a key generator 62, an entitlement control unit 63 and a multiplexer and modulator 64.

The content provider 90 supplies content (such as television signals) to the head end 60. The head end 60 applies conditional access (CA) scrambling and encryption to the content.

More specifically, the CA encryptor 61 encrypts or scrambles the content using a CA key as a control word. The CA key is generated by the CA key generator 62. The scrambled content generated by the CA encryptor is supplied to the multiplexer and modulator 64.

The CA key is also provided to the entitlement control unit 63, which generates ECMs based on the CA keys and EMMs based on subscriber data defining which subscribers are entitled to descramble which content streams. The ECMs and EMMs are supplied to the multiplexer and modulator 64. One or more scrambled content streams from the CA encryptor 61, one or more unscrambled (open access or "free to air") content streams and the entitlement control messages are multiplexed together to form a transport stream such as an MPEG2 transport stream. Known formats are used to carry the content data, the ECMs and the EMMs. The ECMs, EMMs and data defining the type of scrambling used on each elementary stream (corresponding to individual scrambled content streams) are provided in a known format and are referenced using known techniques in a programme map table (PMT and/or in a conditional access table (CAT) which has a predetermined programme identifier (PID) of 0x001, so that the CAT can be recognised at the CICAM.

The multiplexed transport stream is then modulated by the multiplexer and modulator 64 for transmission as a cable, satellite or terrestrial broadcast signal 15.

Host Device

The host device 10 comprises a tuner 11, a demodulator and demultiplexer 12, a demultiplexer ("demux") 13 and a CC (content control) decryptor 14. Note that the host device may have other additional functions; for example, a host device may provide two or more of satellite broadcast reception, cable broadcast reception, terrestrial broadcast reception and network (IPTV) television reception.

Depending on the type of broadcast signal 15, the tuner acts to transform the received signal back to baseband, so that the demodulator and demultiplexer 12 can select and demultiplex a single elementary content stream and associated CAT data from the received signal. The content stream and ECM/EMM data are passed via the common interface 80 to the CICAM 30.

In the case of access-controlled content data, at this stage the content data is still scrambled as it is passed via the common interface 80 to the CICAM 30. This part of the transmission over the common interface 80 is therefore secure by virtue of the CA encryption.

Assuming the ECM and EMM allow it, the CICAM 30 descrambles the content data and re-encrypts it using a content control (CC) encryption. The way in which this is done will be described below. The CC encrypted data is returned to the host device 10 where it is demultiplexed by the demux 13 and decrypted by the CC decryptor 14, so that it can be displayed or passed to another device 70 as clear content.

The host device therefore operates to receive audio/video content and has a content decoder (the CAM module for example) capable of decoding an audio/video programme from a packetized data stream (such as a TS) by using data packets (such as EMM/ECM) defining decryption information. The received TS may comprise one or more programmes having data packets identified by respective sets of packet identifiers (such as PIDs) and comprising identification data (PAT, PMT, CAT and the like) mapping programmes to respective sets of the PIDs.

CICAM

The CICAM 30 comprises a CA decryptor 31, a CA key generator 32, a CC encryptor 33 and a CC key generator 34.

The CA decryptor 31 and the CA key generator 32 may be considered as an access control unit for decoding access-controlled broadcast content or other data. The CC key generator 34 and the CC encryptor 33 of the CICAM 30, and the demultiplexer 13 and the CC decryptor 14 of the host device 10 cooperate to provide an encrypted communication link (the common interface 80) for decoded access-controlled encoded broadcast content, between the CICAM and the host device.

The CA decryptor 31 uses keys generated from received ECMs and EMMs by the CA key generator 32, using checks of the user's identity from the smart card 50, to descramble the received access-controlled content. This part of the operation of the CICAM uses known CA techniques to retrieve and apply the CA keys.

Clear content data is passed from the CA decryptor 31 to the CC encryptor 33. However, as this data transfer is entirely internal to the CICAM, it can be rendered secure and tamper proof by known techniques such as by providing the CA decryptor 31, the CC encryptor 33 and the clear content interface within a single integrated circuit device.

The CC encryptor 33 encrypts the descrambled content using a CC key supplied by the CC key generator 34. This key is established by a secure interchange between the CICAM 30 and the host device 10, and is specific to that CICAM-host device pair. The CC-encrypted content is passed over the common interface 80 to the host device 10. Therefore, this part of the common interface is also secure, as the content data is CC-encrypted as it passes to the host device.

Key Exchange

The CICAM 30 and the host device 10 both contain logic, firmware or software providing algorithms for Diffie-Hellman (DH) secure key exchange, hashing and encryption using the known algorithms SHA-256, DES and AES, respective certificates issued by a certifying authority such as CI Plus LLP, and private keys with the corresponding public keys.

When the CICAM 30 is first associated with the host device 10, the CICAM 30 initiates an authentication process with the host device 10. In this process, each device verifies the other's certificate, and the DH key exchange process takes place so as to securely share keys between the two devices. In particular, the CICAM first requests that the host device provides its certificate data. The CICAM verifies the signature on the host device's certificate. The same process is then carried out by the host requesting and verifying the CICAM's certificate. The CICAM and the host then each demonstrate that they possess the private key corresponding to the public key in the certificate by signing a DH public key and sending it to the other device for validation. The CICAM then obtains and verifies an authentication key AKH from the host. The CICAM and host start to compute and exchange key data for the encryption and authentication of data sent over the common interface 80. In this way, the key, key pair or other key information established by the CICAM and the host for communication over the common interface 80 is specific to that CICAM-host pair.

After authentication, the CICAM also starts to compute the CC key. The CICAM can also instruct the host device to compute the CC key. The CC key is then used as described above to encrypt content data passed from the CICAM 30 to the host device 10, according to the AES algorithm. Therefore, it will be understood that the keys used for the secure common interface 80 are specific to a particular CICAM-host pair.

The host device 10, in conjunction with the CICAM arrangement 30, 50 as described above, represent examples of a content receiver for receiving and decoding audio/video data signals modulated onto transmission channels as packetized transport streams. The arrangements described below are also examples of such a content receiver.

Example embodiments will now be described in which multiple tuners are used, each operable to tune to (select) a single respective transmission channel, though many of the techniques are also applicable to arrangements in which just one tuner is provided. The use of the multiple tuners indicates an example of a tuner arrangement capable of concurrently tuning to two or more transmission channels so as to output two or more respective packetized transport streams. Note that the term "tuner" is used in the broad sense discussed above, and so includes, for example, IP tuners.

Figure 4:
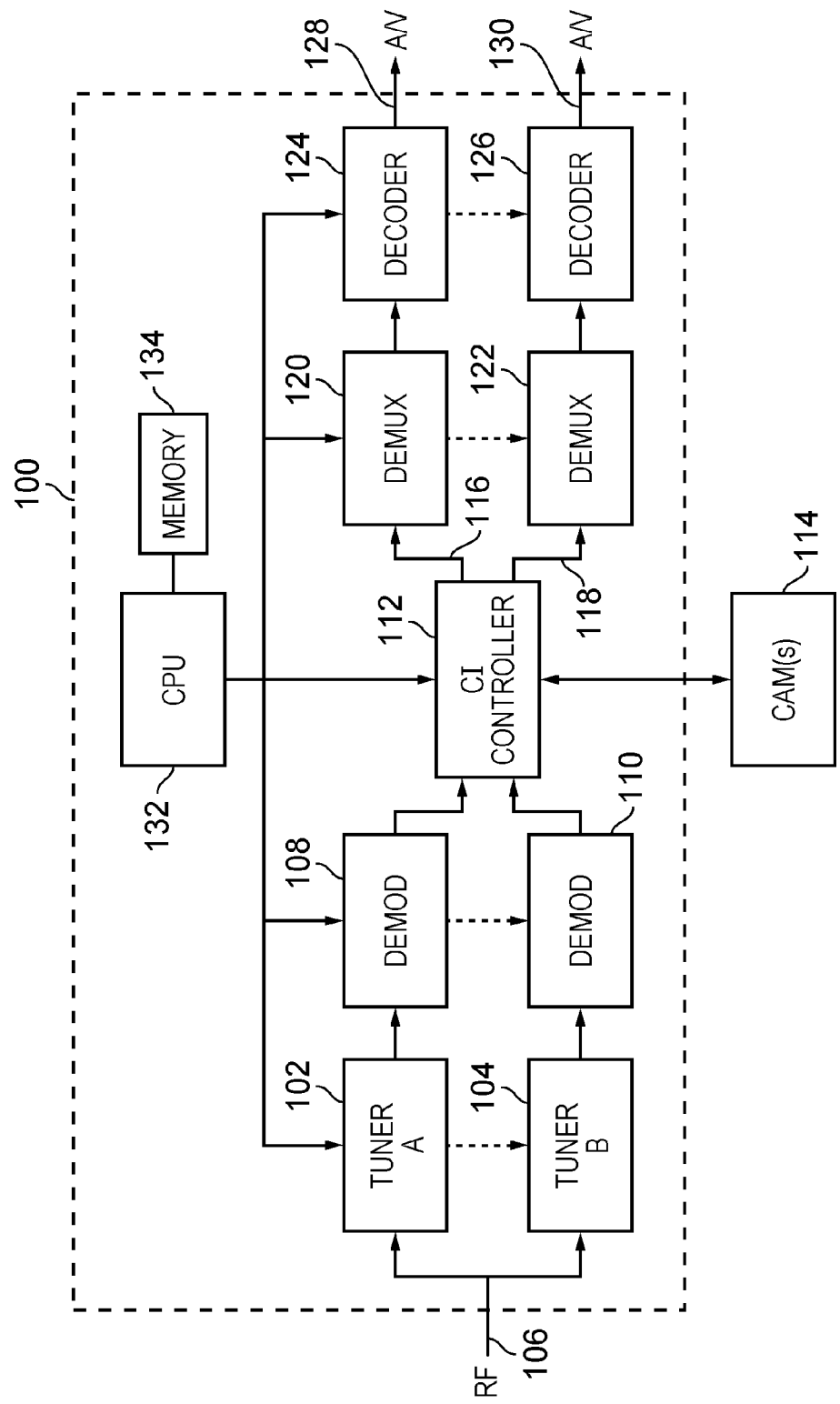
FIG. 4 is a schematic diagram of the host device having multiple tuners.

FIG. 4 is a schematic diagram of a host device 100 having multiple tuners illustrated as tuner A 102 and tuner B 104, each receiving a radio-frequency (RF) input signal. The RF input signal may be a common signal 106 processed by each of the multiple tuners, or may be a different respective signal for different tuners (for example, one tuner may operate in respect of terrestrial broadcast television and another tuner may operate in respect of satellite broadcast television). The system is not limited to two tuners; the principles to be described may be extended to more than two tuners, but only two are shown in FIG. 4 for clarity of the diagram.

Each of the two or more tuners 102, 104 supplies an output to a respective demodulator 108, 110. The demodulators operate as described above (in respect of the demodulator 12 of FIG. 3) to demodulate a packetized data signal or stream from the output of the respective tuner. The packetized data signals from the multiple demodulators 108, 110 are multiplexed together by a CI controller 112 for handling by a set of one or more CAMs 114 as a series-connected set of content decoders. Different options for implementing the set of CAMs 114 will be discussed below, but at a basic technical level, the set of CAMs 114 is capable of concurrently decoding more than one programme service for output. For example, the set of CAMs may be arranged to decode the same number of programme services concurrently as there are tuners provided in the host device 100.

Decoded data received back from the set of CAMs 114 is demultiplexed by the CI controller 112 into respective signals 116, 118 representing the required programme services. These are passed to programme demultiplexers 120, 122 similar in function to the demultiplexer 13 of FIG. 3.

Finally, each programme service is prepared for output by a respective decoder 124, 126 corresponding in function to the CC decryptor 14 of FIG. 3. The decoders 124, 126 generate respective audio/video output signals 128, 130.

The host device of FIG. 4 operates under the control of a central processing unit (CPU) 132 which in turn may be a programmable processor device operating according to software or firmware stored in a memory 134 (which may in turn be a non-transitory machine-readable memory such as a magnetic or optical disk store or a non-volatile semiconductor memory).

Figure 5:
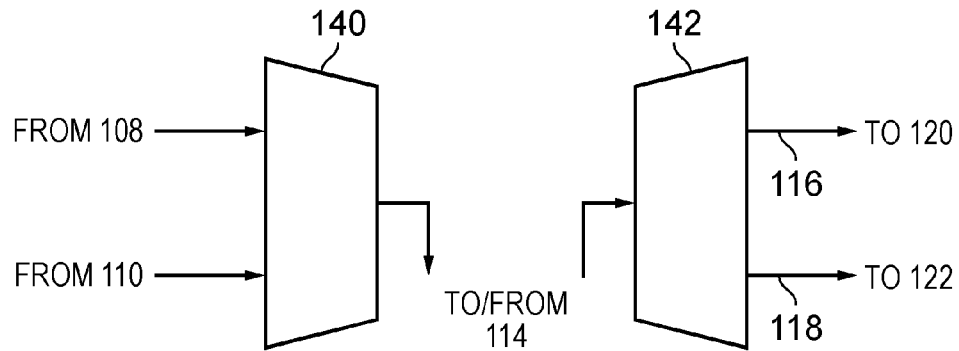
FIG. 5 schematically illustrates a multiplexer-demultiplexer arrangement.

FIG. 5 schematically illustrates a multiplexer-demultiplexer arrangement forming part of the functionality of the CI controller 112 of FIG. 4.

In basic terms, as part of the functionality of the CI controller 112, at least respective portions of the packetized data signals from the demodulators 108, 110 are combined by a multiplexer 140 into a composite packetized data signal to be passed to the set of one or more CAMs 114, and a decoded version of the composite packetized data signal is received by a demultiplexer 142 which demultiplexes it into the respective signals 116, 118 for decoding. There are, however, different ways in which this may be achieved.

The packetized data signals output by the two demodulators 108, 110 may represent so-called transport streams (TS) and would normally include data packets relating to several audio/video programme services along with various housekeeping and control packets. For example, a single packetized data signal may include packets relating to between 3 and 10 programme services, although the choice of how many programme services are represented by an individual TS is as much a commercial choice as a technical choice; a TS provides a certain amount of data bandwidth, but it is then a commercial choice by the broadcaster as to how many programme services should be fitted within that available bandwidth. In order to encode a higher number of programme services within a given bandwidth, the coding quality (which relates to the output quality of the reproduced audio and video signals as experienced by a viewer) of each programme service must be lowered. But in any event, it is likely in normal use that each one of the packetized data signals generated by one of the demodulators 108, 110 will contain packets of data other than those required to decode a particular desired programme service.

A technical choice then arises, in that it is possible, at least in principle, for the CI controller 112 simply to combine the multiple packetized data signals output by the demodulators 108, 110 such that all of the information contained in each packetized data signal is retained. This would give a composite packetized data signal having a data bandwidth of the order of n×the bandwidth of an individual TS, where n is the number of individual TSs being multiplexed together by the multiplexer 140. A potential problem with this type of arrangement is that the CAMs 114 may not be able to handle such a high data rate packetized data signal. One potential reason is that the CAMs may be designed for compatible use in respect of just a single packetized data signal.

Accordingly, in other arrangements, a respective subset of data packets is extracted from each of the packetized data signals output by the demodulators 108, 110, and the composite packetized data signal to be supplied to the set of one or more CAMs 114 is formed from a combination of these respective subsets. Techniques for forming this combination in order to generate the composite packetized data signal will be discussed further below.

Figure 6A:
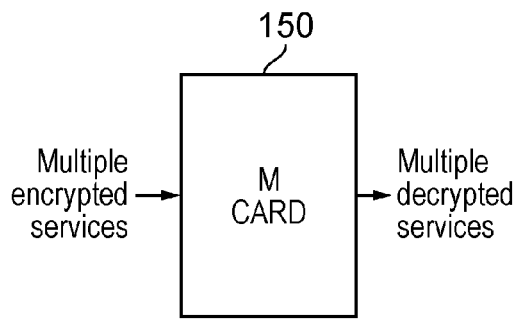
FIG. 6a schematically illustrates a so-called M card.
Figure 6B:
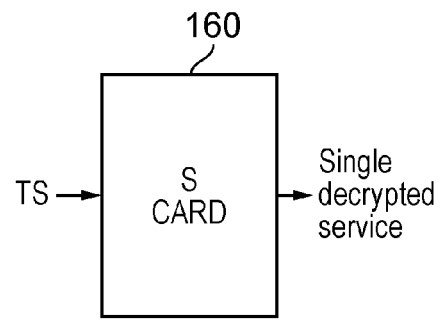
FIG. 6b schematically illustrates a so-called S card.

Two types of CAM are relevant to the present discussion. FIG. 6a schematically illustrates a so-called M (multistream) card 150, and FIG. 6b schematically illustrates a so-called S (single stream) card 160.

A main technical difference between these two types of CAM is as follows. The M card 150 is a single unit capable of concurrently decoding or decrypting more than one encrypted programme service. This represents a more modern implementation of the CAM system than the S card, which is more of a legacy device capable of decrypting only one programme service from a TS. Note that an M card can operate in either a multi-stream or a single stream (S card) mode. An S card can operate only in a single stream mode.

Figure 7A:
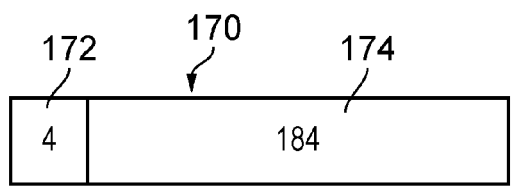
FIG. 7a schematically illustrates a transport stream (TS) packet.

FIG. 7a schematically illustrates a transport stream (TS) packet 170. The packets comprise a 4-byte header portion 172 and a 184-byte payload portion 174. This is a standard format for TS packets, and a TS is formed of a succession of packets of this form. The header portion 172 includes a packet identifier or PID. Each audio/video programme service has an associated set of two or more PIDs. For example, one PID may be associated with video packets of a programme service, another PID may be associated with audio packets of the programme service and a further PID may be associated with encryption control packets of the service. Therefore, within a single TS, many different PIDs may be in use. The allocation of PIDs to different types of packets is handled by a programme allocation table (PAT) and a programme map table (PMT). The PAT itself has a PID of 0 and functions so as to indicate the PID of the packets carrying the PMT. The PMT indicates the PIDs of packets carrying video and audio data as well as the PID of packets carrying the ECM data for a service. For completeness, a conditional access table (CAT) has a PID of 1 and indicates which packets carry the EMM data for one or more access control systems.

Figure 7B:
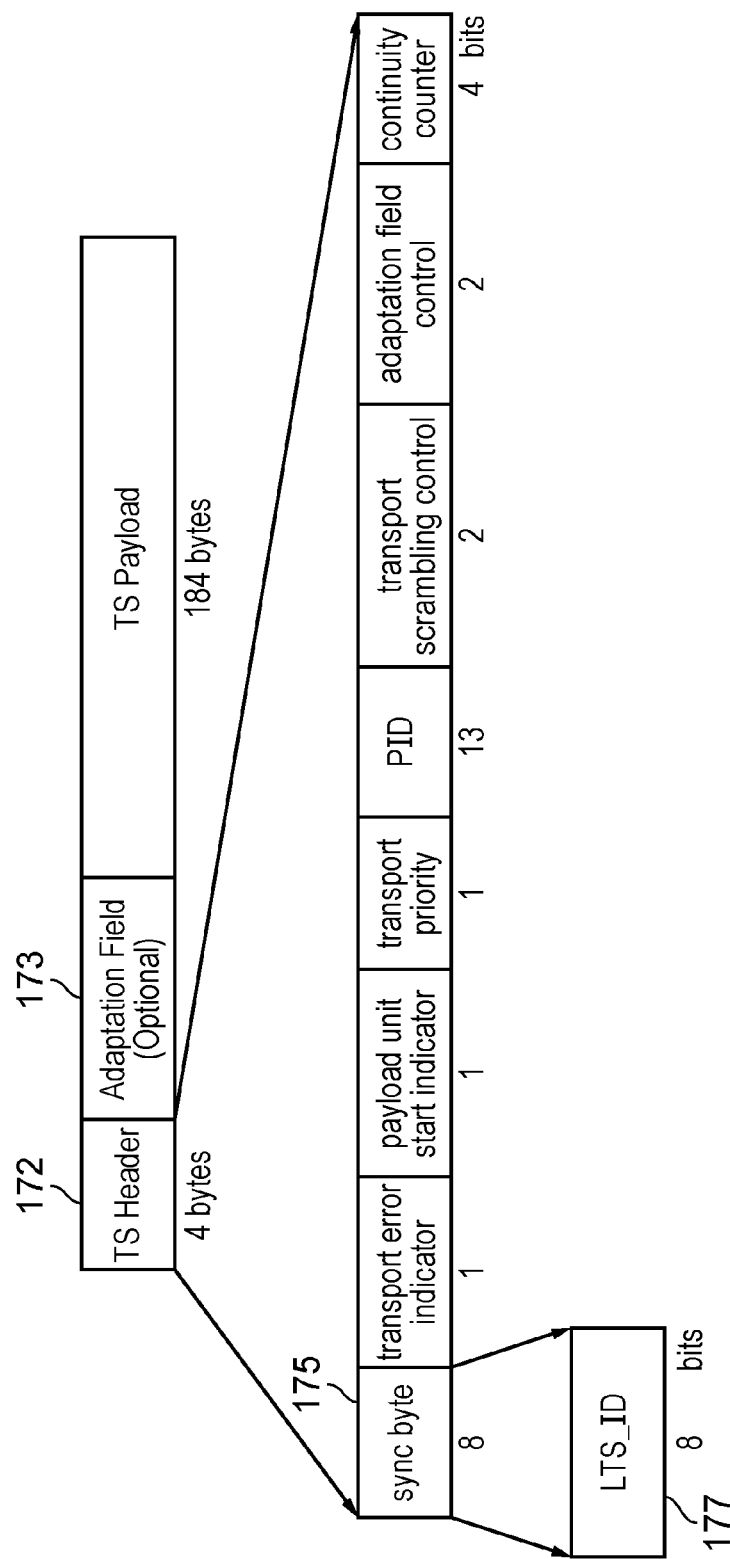
FIG. 7b schematically illustrates a TS header in more detail.

FIG. 7b schematically illustrates the TS header 172 in more detail, and also schematically illustrates a so-called adaptation field 173 to be discussed in more detail below.

The four-byte TS header 172 includes a number of fields, namely a synchronisation byte 175, a transport error indicator, a payload unit start indicator, a transport priority flag, the PID, a transport scrambling control flag, an adaptation field control flag and a continuity counter. The synchronisation byte 175 is used to store a local transport stream ID (LTS_ID) 177 (an example of a local identification value) which is assigned by the host to identify each TS and substituted into the packet synchronisation field in each packet, that is the field within each packet (or at least each packet which is forming part of the composite data stream) previously occupied by the synchronisation byte. The value of the LTS_ID field is constrained so as to be unique (with respect to that particular host) for each input TS, or in other words to be unique with respect to other LTS_ID values allocated by that content receiver (or at least, those LTS_IDs concurrently in use with that LTS_ID) and is also constrained so as not to change during the duration of the particular TS. Apart from these constraints, the value of the LTS_ID may be determined by the host. CICAM modules are not allowed to change the LTS_ID field. The LTS_ID field occupies 8 buts and so (in an unsigned representation) may take any value between 0 and 255 (decimal).

By using the synchronisation byte 175 to store the LTS_ID, this removes the function normally provided by the synchronisation byte, which is to indicate the start of each packet. This function of indicating the start of a packet is carried out within a CI Plus by control signals of the CI Plus TS interface, known as the MISTRT and MOSTRT control signals. Note that the synchronisation byte is restored by the demultiplexer once the individual TS packets originating from each tuner are separated once again.

Accordingly the multiplexer is configured to generate a composite data signal from received audio/video signals relating to required programmes for decoding, each packetized transport stream being identified in the composite data signal by a local identification value (LTS_ID in this example) allocated to that packetized transport stream by the content receiver.

The PIDs are uniquely defined within a single TS, in a 13 bit range (0 to 8191 in decimal). However, from TS to TS, the data represented by a particular PID value may be ambiguous. That is to say, PID values may be reused across different TSs. In the case that multiple TSs are multiplexed together by the multiplexer 140, a mechanism is needed to overcome this potential ambiguity in the allocation of PID values.

One technique for achieving this is described in U.S. Pat. No. 7,394,834, the contents of which are incorporated into the present description by reference. In this document, packets representing desired services are extracted from multiple input TSs, and the PIDs for packets extracted from at least one of the TSs are re-mapped to new PID values which are not used in respect of any data extracted from the other TS. The re-mapping process involves replacing a PID value with another PID value, with a record or a re-mapping table being maintained so that the desired service can be identified from the new (re-mapped) PID values. This arrangement can be used to generate a pseudo-TS, which is to say an artificially produced TS, present only within the host device, but which appears (from the point of view of an S card) to fulfil all the format requirements of a broadcast TS. That is to say, the pseudo-TS can be decoded by an S card as though it had been broadcast in that form, even though it is in fact generated within the host device by combining parts of multiple broadcast TSs.

Figure 8:
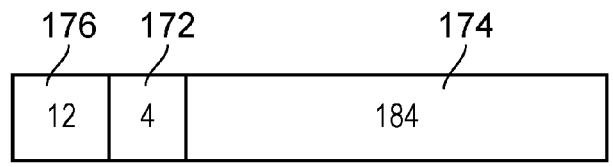
FIG. 8 schematically illustrates a data packet of a composite packetized data stream.

Another technique is to use a pre-header which is inserted at the beginning of each TS packet and which provides further information as to the origin of that packet. This technique is used when sending data to M cards operating in multi-stream mode. An example of a TS packet with a pre-header 176 is shown schematically in FIG. 8.

The pre-header 176 comprises 12 bytes of additional data and is pre-pended by the host to each packet sent to an M card. That is to say, it is added before the beginning of each packet. The 12 bytes of additional data comprise various fields including a local transport stream identifier, which identifies the TS from which the packet was derived, a local timestamp, error detecting data for detecting errors within the pre-header, and reserved data fields for later or proprietary use. Importantly for the present purposes, the local transport stream identifier means that even in the situation where packets in a composite packetized data stream have conflicting PID values, they can still be distinguished by their local transport stream identifier value in the pre-header.

Note that an M card requires the additional pre-header to be present. An S card cannot operate with the additional pre-header present.

So, in another arrangement, the multiplexer 140 combines packets taken from multiple TSs into a composite packetized data stream suitable for use by an M card, pre-pending the additional pre-header to each such packet in dependence upon at least the identity of the TS from which that packet originated.

Figure 9:
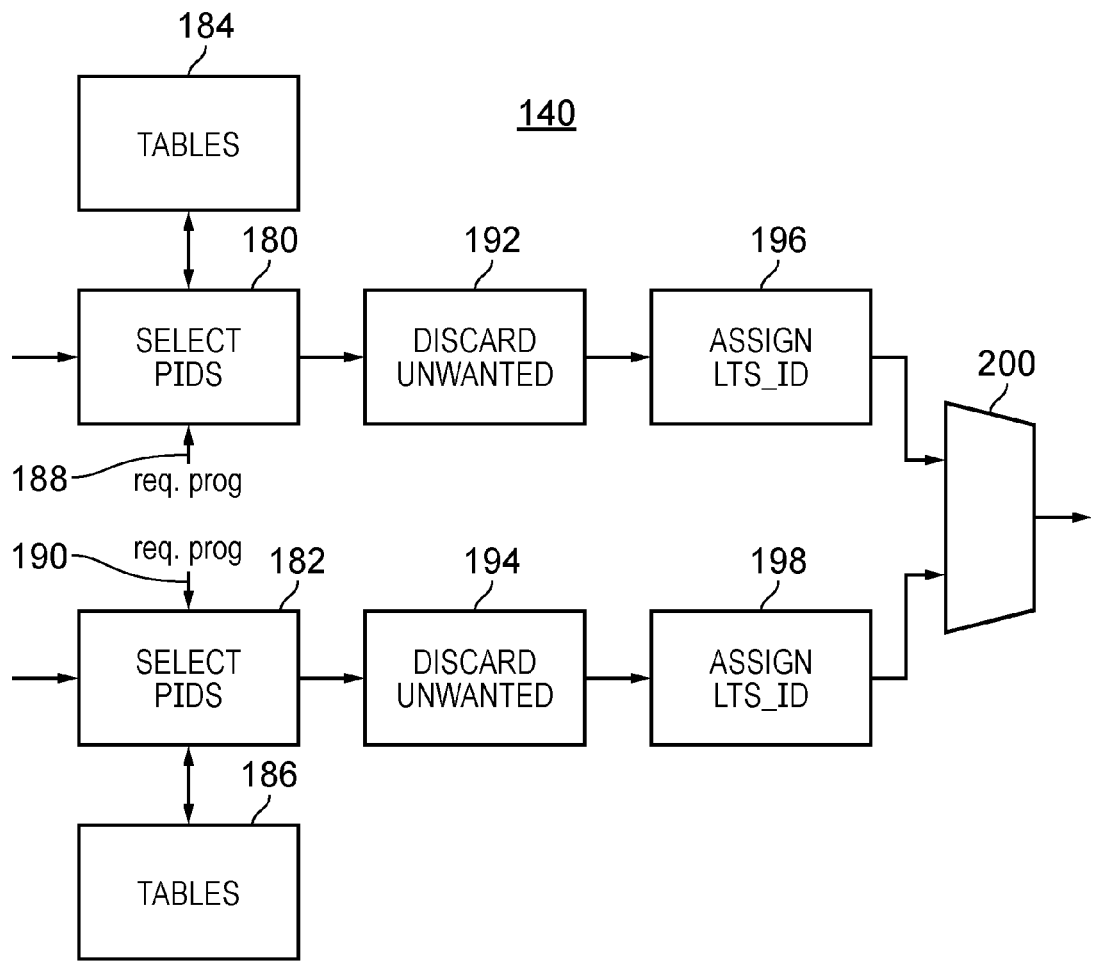
FIG. 9 schematically illustrates a multiplexer arrangement in more detail.

FIG. 9 schematically illustrates a multiplexer arrangement in more detail. The multiplexer arrangement of FIG. 9 is relevant to an arrangement in which a pseudo-TS is generated for decoding by S cards and by M cards operating in single-stream mode.

Each input transport stream is passed to a respective PID selector 180, 182 which refers to the programme allocation table 184, 186 associated with that TS and to data 188, 190 defining a required programme service, to establish the PIDs which are required to be passed for decoding as part of the composite packetized data signal.

In embodiments of the disclosure, the selectors 180.182 are operable to do one or more of the following:

to select data packets from the packetized data stream for a required programme according to the set of packet identifiers defined by the identification data for that stream in respect of the required programme;

to select further data packets from the packetized data stream from which a programme is selected which have packet identifiers not included in the identification data for that packetized data stream; and to select further data packets from each packetized data stream from which a programme is selected which contain programme clock reference data relating to the selected programme.

These features of the selectors' operation will be described further below.

The data 188, 190 defining a required programme service may be provided by the CPU 132, for example, possibly in response to a user control of a remote commander (not shown) or other user interface control (not shown), or possibly in response to a machine control, for example from a video recording device operating in a timer mode and requiring a certain programme service to be received during a pre-set time interval for recording. A unit 192, 194 for each TS discards "unwanted" packets, that is to say, packets which do not have PIDs defined by the selection made and the selectors 180, 182. An LTS_ID allocation unit 196, 198 is used to assign LTS_IDs to the remaining packets of the TS, noting (as discussed above) that one LTS_ID is assigned for each TS.

Note that the LTS_ID allocation units 196, 198 are shown here as part of the functionality of the multiplexer, but they may be implemented outside of the multiplexer, as part of the signal chain applicable before the PID selection (180, 182) even takes place. Also, even if the LTS_ID allocation units are considered within the overall operation of the multiplexer 140, they can be implemented at any stage in the processing before the different TSs are combined (by a combiner 200—see below). In this way, by flagging each TS with an LTS_ID, even if there is a conflict or ambiguity in the PID values, the combination of PID value and LTS_ID will be unique within the host.

In further embodiments, the selectors 180 can be arranged to include in their selection so-called programme clock reference packets so that these packets are included within the composite packetized data stream.

As background, programme clock reference (PCR) data are used to provide timing information for the decoding of audio and video data within a TS. The PCR data are relatively small and in fact are included within TS packets in the so-called adaptation field 173 (FIG. 7b). The adaptation field is positioned within the 184 byte payload 174 but in terms of function, acts more like an extension (into the payload area 174) of the header. To signal the presence of an adaptation field, the header carries a flag indicator (such as a one bit flag). There is then a further signalling arrangement associated with an adaptation field, to indicate in turn that the adaptation field includes PCR data. So, the selectors 180 can detect a packet that carries PCR data by first checking the "is an adaptation field present?" flag in the packet header, and then checking the "does the adaptation field carry PCR data?" flag associated with the adaptation field.

The timing information indicated by the PCR data is generally common across all programme services in a TS. So, there is generally a need only to provide one set of PCR data within a TS. It is common in the art for the PCR data for a TS to be carried by adaptation fields in packets relating to an arbitrary one of the programme services. The PID of the packets carrying the PCR data for a TS may be indicated in a field PCR_PID in the PMT.

In arrangements where a whole TS is passed to a CAM for decryption (as in a single tuner: single CAM arrangement, or an arrangement with a dedicated CAM for each tuner or TS source), the fact that the PCR data may be in packets relating to a programme service other than the currently viewed or decoded programme service is not a problem, because the PCR data will still be available to the CAM and then to the decoder.

But in the present embodiments, where a composite packetized data stream is formed as a combination of subsets of multiple input TSs, with each subset relating to a required programme service, there may be situations in which the PCR data for a programme service is missing, because it is carried by packets relating to a programme service other than the selected programme service for that TS.

To address this, the selectors 180 can examine the so-called adaptation field of each packet and (if an adaptation field is present) the PCR data flag, so that if the packet is a packet containing programme clock reference data then the packet is selected whether or not it relates to a selected programme service. The packet containing PCR data is included within the selection and so included within the composite packetized data stream.

The selected and, where appropriate, re-mapped packets are then combined into a single composite data stream by the combiner 200. For example, this may be by a process of concatenation, which in general terms simply means putting side by side in the composite data stream. It does not necessarily imply that the packets are directly adjacent (there could be gaps), nor does it necessarily imply any particular packet order.

In the packetized data stream assembled using these techniques may therefore contain multiple sources of PCR data. In general, there may be data packets containing PCR data which originate from each TS from which a programme service is selected for inclusion in the composite packetized data stream. However, the decoder in respect of each programme service will be able to access the correct PCR data. If the PCR data is included within packets of the programme service to be decoded, then the decoder will use that PCR data. If the PCR data in the original TS was included in packets relating to another programme service, then these packets will be included in the composite packetized data stream by the mechanism described above. In either case, even if PID re-mapping is used, the PCR_PID data (as re-mapped if necessary) is carried for each programme service in the composite packetized data stream. Indeed, a set of data from the PAT and/or PMT is carried into the composite packetized data stream as composite stream identification data in respect of each selected programme service, for example to indicate the packets containing audio, video and CA data, as well as to indicate the PCR_PID.

Accordingly, when the receiving step comprises receiving two or more packetized data streams; the selecting steps discussed above are applied to each packetized data stream from which a programme is selected; the composite packetized data stream comprises programme data from two or more of the packetized data streams; and generating the composite packetized data stream comprises concatenating the selected packets to form the composite packetized data stream.

Figure 10:
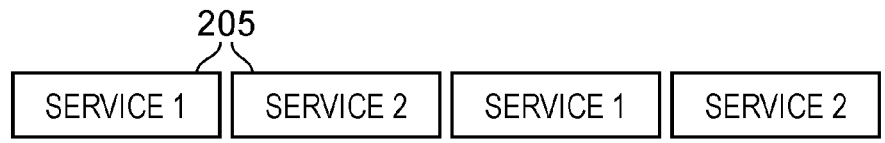
FIG. 10 schematically illustrates TS packets of two services.

FIG. 10 schematically illustrates TS packets 205 of two programme services, service 1 and service 2, combined into a single composite packetized data stream.

Figure 11:
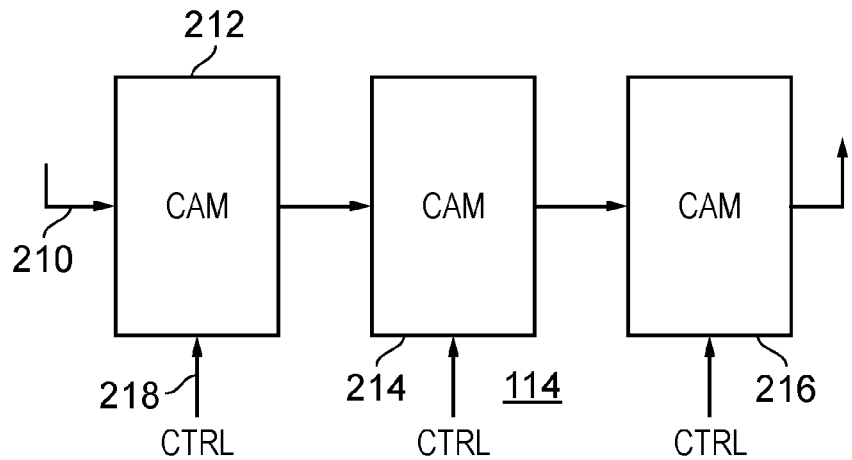
FIG. 11 schematically illustrates a set comprising a succession of CAMs.

FIG. 11 schematically illustrates a succession of CAMs, forming an example of the set of CAMs 114 discussed above. The CAMs are arranged in series, as a series-connected arrangement, otherwise referred to as a so-called daisy-chain, so that the composite packetized data stream from the CI controller 112 is supplied as an input 210 to a first CAM 212 in the series, and is routed from the first CAM 212 to a second CAM 214, from where it is passed to a third CAM 216 before being returned, with the required services decrypted on the basis of the packet identifiers passed with or as part of the composite data stream identification data, to the CI controller 112. The CAMs in the daisy-chain can be arranged to provide decryption of different conditional access services, so that whichever service (within the range of services and CA systems handled by the set 114) is selected for decryption by user or machine control, one of the set of CAMs 114 is capable of decrypting it. A technique by which the host can select the appropriate CAM for a particular programme service to be decrypted will be described below with reference to FIG. 14. The daisy-chain of cards represents an example of a content decoder capable of concurrently decoding two or more audio/video programmes from the composite data signal.

Accordingly, the content decoder when formed as a set of CAMs or a M card CAM is capable of concurrently decoding two or more audio/video programmes from a single packetized data stream; and in such cases the step of generating the composite packetized data stream comprises forming the composite packetized data stream from packets representing two or more programmes.

Note that there are two main interfaces to each CAM. Audio, video and some control data can be passed to the CAMs as part of the composite packetized bit stream supplied at the input 210 and passed from CAM to CAM. An additional, much lower data rate, control interface 218 is provided between the CI controller and each CAM. Control signals to be discussed below can be multiplexed into the composite packetized data stream or carried by the control interface.

In general terms, only one CAM acts to decrypt a particular programme service, and the CAM cannot decrypt a programme service unless it receives an instruction from the host to do so.

Figure 12:
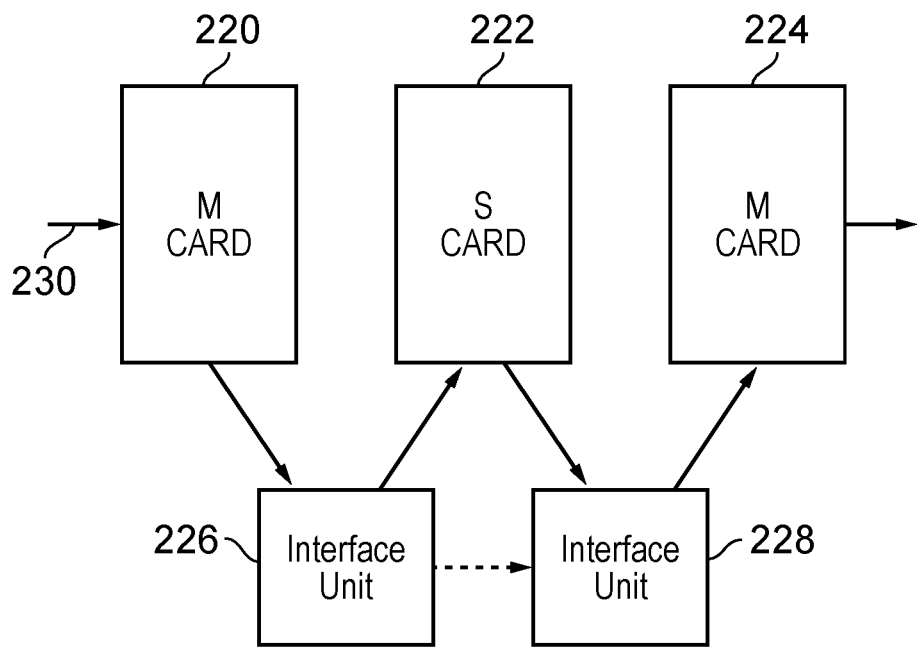
FIG. 12 schematically illustrates a succession of CAMs with interface units between them.

In embodiments of the disclosure, the arrangement of FIG. 11 can be operated when all of the CAMs in the daisy-chain arrangement are S cards (or M cards operating in single-stream mode), or when all of the CAMs in the daisy-chain arrangement are M cards, because in either case the data format for the composite packetized data stream is the same across the whole of the daisy-chain arrangement of CAMs. For use in situations where this is not the case, FIG. 12 schematically illustrates a succession of CAMs 220, 222, 224 with interface units 226, 228 between them.

In an example arrangement, assume that the CAM 220 is an M card, the CAM 222 is an S card and the CAM 224 is an M card. A composite packetized data signal 230 received from the CI controller 112 is in the M card format, which is to say it includes the additional pre-header discussed above. This signal is handled in a conventional way by the M card 220 but instead of being passed directly to the next card 222 in the daisy-chain arrangement, it is instead passed to the interface unit 226 where the additional header information relating to the pre-header is stripped off the packets before the composite packetized data stream is passed to the S card 222. The interface unit 226 retains the stripped data relating to the original composite packetized data stream, and passes this retained information to the interface unit 228 which receives the output data stream from the S card 222. The interface unit 228 re-inserts the pre-header onto each packet The output data stream from the interface unit 228 is then passed to the M card 224 in order to be processed.

In embodiments of the present disclosure, the interface unit 226 passes only packets having a single LTS_ID to the S card 222. Data relating to packets having different LTS_IDs are passed directly to the interface unit 228 for recombining into the composite data stream to be passed to the M card 224.

Figure 13:
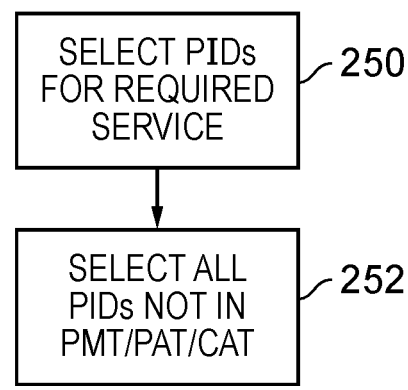
FIG. 13 is a schematic flowchart illustrating the handling of so-called ghost PIDs.

FIG. 13 is a schematic flowchart illustrating the handling of so-called ghost PIDs.

Ghost PIDs relate to so-called ghost packets in an MPEG transport stream. In some instances, ghost packets may be used by contributors to the broadcast system such as host device manufacturers, receiver manufacturers, broadcasters, CA system vendors and so on to provide confidential control information (as a "private data" field, for example) to various parts of the host device and in particular the CAM or CAMs in use at a host device.

In general terms, it is considered desirable to keep such packets secret, or at least not to advertise their presence, because they may contain information which could be useful to an unauthorised user or hacker to undertake unauthorised decryption of one or more services.

In a simple example, the ghost packets may include a firmware update for a CAM device, which in turn represents data which the CA vendor or the CAM manufacturer would normally prefer to keep away from potential hackers. To achieve a degree of confidentiality, packets containing such data may be transmitted using PIDs which are derivable by the CAM according to (for example) a predetermined algorithm based on the current time or other conditions, but which are not indicated as part of any of the allocation tables forming part of that TS. So, the ghost packets are potentially important for use by the CAM devices, but as they are not included within any of the allocation tables then unless specific action is taken to avoid this, they may in fact be discarded by the units 192, 194 in FIG. 9 and may not be present in a composite packetized data stream which is actually supplied to the CAM.

To address this potential problem, the selectors 180, 182 and the discarding units 192, 194 of FIG. 9 can operate according to the following steps shown in FIG. 13.

At a step 250, the selectors 180, 182 select the PIDs for the required programme services. This represents a mode of operation corresponding to that already described with reference to FIG. 9. A difference with respect to FIG. 9, however, is that at a step 252, the selectors also select all PIDs which are not specified by the PMT, PAT or CAT for that TS. So, at this stage, the selectors do not know what technical meaning may be attached to the ghost PIDs, but they are selecting all PIDs which are present in the TS and which do not specifically correspond to programme services other than the required programme service. Note that the PIDs used to indicate ghost packets can change from time to time. Indeed, this might be part of the security procedure associated with those packets. Also, the ghost packets may not be broadcast very often. So, when the system of FIG. 9 first operates in respect of a particular programme service from a particular TS, it may not be aware of the current set of ghost PIDs. It may become aware of them by one of two techniques: by the detection (by a selector 180, 182) of a PID in the data stream which is not referenced in any of the reference tables, or by a CAM requesting a particular PID (for example, via the control interface) which the CAM considers it requires but which is not in the composite packetized data stream. The first of these may be considered as a pre-emptive selection, the second as a reactive selection. In either case, the selector 180, 182 can act to select that PID for inclusion in the composite packetized data stream. This may in principle happen straight away, such that the first instance of such a PID is included in the composite packetized data stream. Or there may be a delay, particularly if the inclusion of the PID is in response to a request from a CAM querying the absence of the PID. This is a potential occurrence because of the relatively slow data rate of the control interface. But a small delay (for example, less than one second) is not considered a problem, because it is common practice to transmit multiple times any important packets which are not part of the audio/video stream. This is to cope with the fact that the user may switch on or switch off his receiver at any time, so it would be bad practice to transmit a critical packet on just a single occasion, at a time when the user may be unlucky enough just to miss that transmission.

Figure 14:
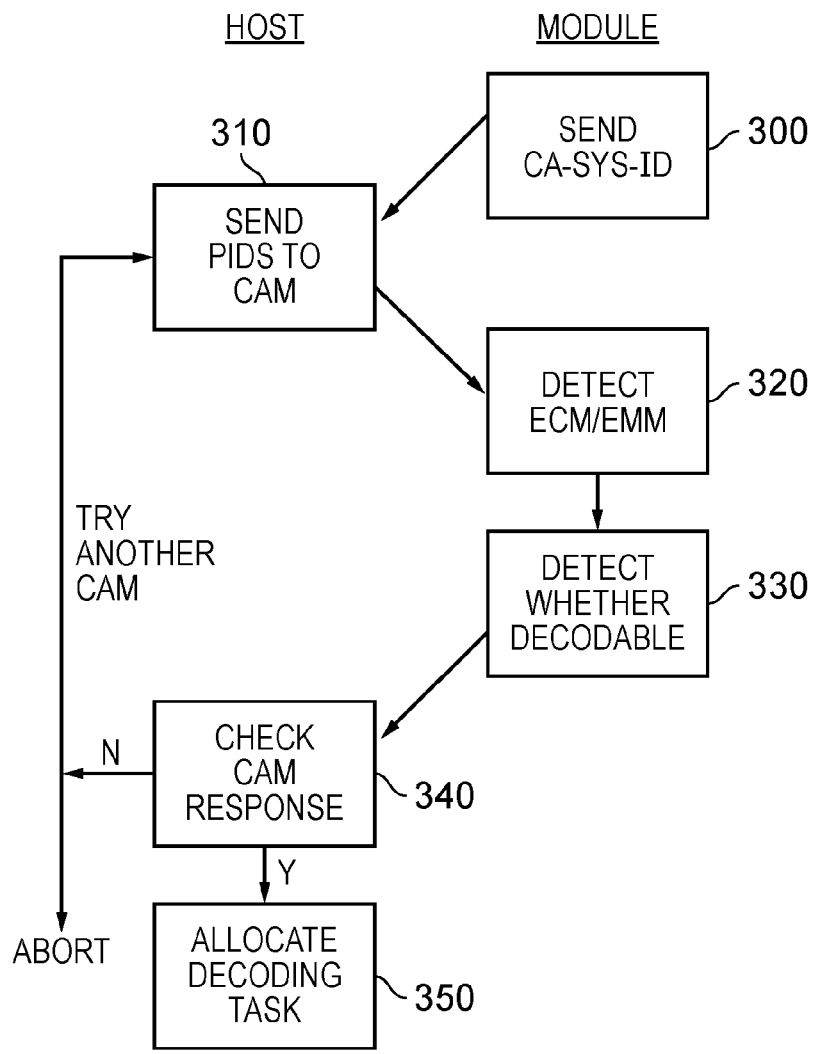
FIG. 14 schematically illustrates operations involved in detecting which CAM of a succession of CAMs is capable of decoding the required programme service.

FIG. 14 schematically illustrates operations involved in detecting which CAM of a succession of CAMs is capable of decoding the required programme service.

The operations shown in FIG. 14 represent an interaction or handshake between the host and each CAM in the set of CAMs 114. Operations relating to only one CAM of the set will be described, but it will be understood that corresponding operations would be carried out in respect of other ones of the set.

A step 300 is carried out when the system starts up or boots, in that each CAM sends data (a so-called CA_SYS_ID) to identify the type of CA system(s) which that CAM is capable of decrypting, subject to receiving the appropriate ECM/EMM data for the service.

A step 310 takes place when a new programme service is selected for decryption, for example by operation of the user control or under the control of a timed recording device, or when the CA parameters associated with a programme service change (for example, from "clear" to "encrypted" or the other way around). The host sends an identification of the PIDs relating to the required programme service to a CAM in the set 114. Each CAM detects the ECM and EMM data relating to that service at a step 320 and, at a step 330 detects (with reference to the ECM and EMM data, as well as the CAM's own capabilities) whether that service is decodable by that CAM. Of course, at the step 310, the host might elect to send the PIDs in question only to those CAMs which indicated, at the step 300, a basic capability (in principle) to decode that type of data.

At a step 340, the host checks the response from the current CAM which is being queried. If the CAM can decode the programme service then at a step 350 the host allocates a decoding task for that programme service to the currently queried CAM. If not, then if there remains a further CAM which has not yet been queried, then the host returns control to the step 310 to query that next CAM. Otherwise, if no further CAMs remain to be queried, and the process is aborted and, optionally, the user is notified that the required programme service cannot be decrypted by the set of CAMs 114 present in the system.

Figure 15:
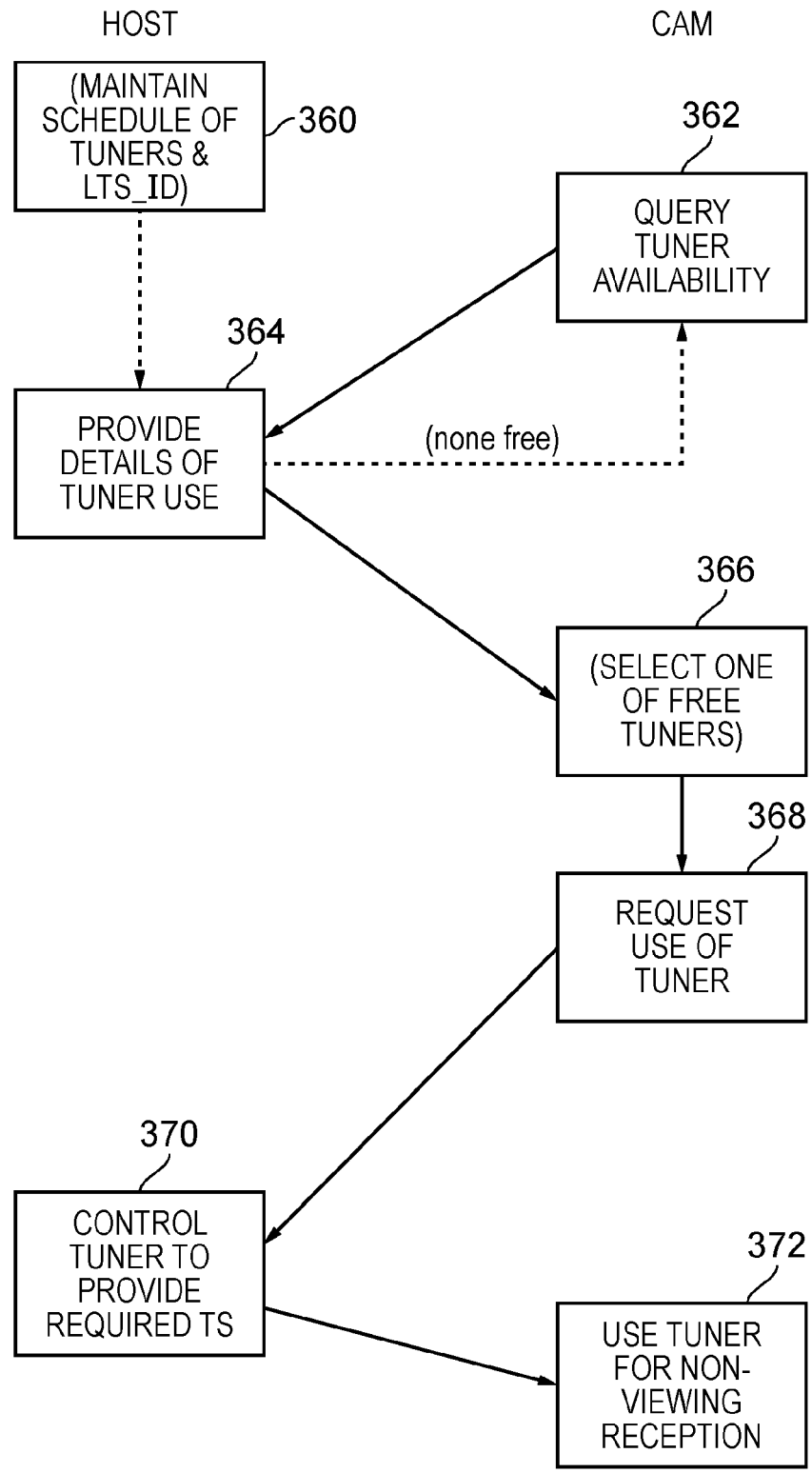
FIG. 15 schematically illustrates control of multiple tuners by the host device.

FIG. 15 schematically illustrates control of multiple tuners 102, 104 by the host device, and in particular example by the CPU 132 of the host device. In FIG. 15, the left-hand region of the diagram relates to operations carried out at the host, and the right-hand region relates to operations carried out at a CAM of the set 114.

The steps attributable to the host may be carried out by, for example, the CPU 132 (under control of software stored in the memory 134), possibly in conjunction with the CI controller 112. These items therefore represent an example of a detector configured to detect whether one or more of the transmission channels tuned by the tuner arrangement are not currently in use in respect of providing a programme for decoding, and a controller, responsive to a detection that a transmission channel is not currently in use, for controlling the tuner to tune that channel to a transmission channel (being one of a group of at least one transmission channel of the available transmission channels) carrying a packetized transport stream including non-viewing information.

A step 360 schematically illustrates a process which the host carries out on an ongoing basis (that is to say, not necessarily in response to the initiation of the process illustrated in FIG. 15), whereby the host maintains a schedule of tuners and associated LTS_IDs.

Note that (as discussed above) multiple tuners can be used in the present embodiments, not just the two tuners described earlier. Note also that an LTS_ID is assigned by the host to each received TS. A tuner is arranged to receive only one TS at a time. That is, to say, the tuner separates the "received" TS from any other TSs forming part of the same data carriage arrangement. So, for example, in a terrestrial broadcast arrangement, the tuner separates and delivers one TS from the multiple TSs that may be broadcast within the same band. In an IP delivery system, the tuner establishes appropriate data connections so as to deliver one TS as its output. There is therefore a one-to-one relationship between tuners and TSs, and therefore a one-to-one relationship between tuners and LTS_IDs. A possibility, therefore, is for the host to associate a particular LTS_ID value with a tuner X, so that the LTS_ID is assigned to "whatever TS is currently being received by the tuner X", although in other arrangements the LTS_IDs can be assigned differently from time to time as between tuners and TSs. Note that, as discussed above, each transmission channel tuned by the tuner arrangement carries encoded audio/video content as a respective packetized transport stream, each transport stream comprising one or more programmes having data packets identified by respective sets of one or more packet identifiers (PIDs).

An example of the allocation of LTS_ID values in an example system having six tuners (tuner 1 . . . tuner 6) might be as follows:

| | |
|---|---|
| tuner 1 | LTS_ID 1 |
| tuner 2 | LTS_ID 2 |
| tuner 3 | LTS_ID 3 |
| tuner 4 | LTS_ID 4 |
| tuner 5 | LTS_ID 5 |
| tuner 6 | LTS_ID 6 |

Turning now to the process steps shown in FIG. 15, the CAM (an arbitrary one of the multiple CAMs in the system) is trying to establish which tuner it can use in respect of non-viewable reception. Here, the term "non-viewing reception" may relate to the reception, by a CAM, of control information for use by the CAM, for example housekeeping data, firmware or software updates or the like, which may require the exclusive use by that CAM of a tuner for a period of time. Non-viewing information can be carried by one or more received transport streams.

Another example relates to so-called "push video on demand" or push-VOD. In this arrangement, a CAM can, preemptively or under instruction from the head end, cause the reception of data to be stored on, for example, a hard disk recorder, relating to video programmes which the user might wish to watch. The received data could relate to the whole programme or could relate to a trailer or advertisement for the programme, or could provide enough buffer data to allow an instant initiation of replay (at the user's command) even when the programme is being streamed. Reception of this type of data is not specifically requested or instructed by the user; it is received at the initiation of the CAM or another part of the system as a background process, and is considered as "non-viewing data" because (a) it is often in the form of data which is transmitted at a data rate lower than a decoding or viewing data rate, and (b) the user must generally take other steps (such as requesting access to the data on a hard disk recorder) before even a viewable portion may be viewed. In this regard, the CPU 132 in conjunction with the CI controller 112 may act as a store controller to control storage of the non-viewing information or data as received and decoded, for example for later access.

At a step 362, the CAM queries the host as to the availability of the various tuners in the system. At a step 364 the host replies with details of the tuners' availability.

The reply from the host can be in various different forms. In some embodiments the host replies with a full set of availability, for example as shown schematically in the following table:

| tuner 1 | free   | LTS_ID 1 |
| tuner 2 | watch  | LTS_ID 2 |
| tuner 3 | record | LTS_ID 3 |
| tuner 4 | free   | LTS_ID 4 |
| tuner 5 | NVD    | LTS_ID 5 |
| tuner 6 | record | LTS_ID 6 |

The term "watch" means that the user is currently viewing a service being received by that tuner (or at least, the service is being received and decoded for display). The term "record" signifies that a personal video recorder or the like is currently recording a service received by that tuner. "Free" signifies that the tuner is available for use by the requesting CAM. "NVD" signifies that the tuner is already in use by another CAM to receive non-viewing data.

In other embodiments, the host might include in its reply at the step 364 information associated with each tuner to indicate to the CAM the capabilities of the tuner, for example:

| tuner 1 | DVB-T         | free   | LTS_ID 1 |
| tuner 2 | Satellite AAA | watch  | LTS_ID 2 |
| tuner 3 | Satellite BBB | record | LTS_ID 3 |
| tuner 4 | DVB-T         | free   | LTS_ID 4 |
| tuner 5 | IPTV          | NVD    | LTS_ID 5 |
| tuner 6 | IPTV          | record | LTS_ID 6 |

This allows the CAM to select a tuner having the appropriate capabilities to receive the non-viewing data required by that CAM. Of course, such information may already have been made available to the CAM, for example as part of a configuration file. DVB-T signifies a terrestrial digital video broadcasting service. The satellite tuners may specify which satellite's data is being received.

In other embodiments, the host may reply with only details of tuners which are "free", that is, available for use by the querying CAM. In further embodiments, the CAM might specify the type of tuner (DVB-T for example) it requires, so that the host replies with details of only those tuners which are (a) free, and (b) configured to receive that type of data.

If the host does not give details of any available tuners, or no tuners are free which meet the requirements of the CAM, then control returns to the step 362. To avoid the CAM continuously requesting tuners, and so occupying the host excessively, the CAM may impose a delay of (say) one minute between successive requests at the step 362.

If the CAM is given a choice of tuners by the host, then at a step 366 the CAM selects one of the free tuners in accordance with its needs. Otherwise, if the host returns only one tuner for the CAM to use, the CAM does not implement the step 366. In other words, no choice or selection of tuners is required; the CAM just uses the one returned by the host.

At a step 368, the CAM requests the use of the selected tuner for receipt of non-viewing data, identifying the packets from that TS by use of the LTS_ID associated with the selected tuner. In response, at a step 370, the host controls the tuner to provide the TS required by the CAM, and at a step 372 the CAM uses the tuner for non-viewing reception. Note that if the arrangement is such that the CAM can directly control the tuners, then the steps 368 and 370 may be omitted. Accordingly, the CAM represents an example of a non-viewing information decoder for decoding the received non-viewing information, the non-viewing information decoder identifying packets of the non-viewing information, at least in part, by reference to the local identification value associated with the packetized transport stream carrying that non-viewing information.

Note that the host may allocate LTS_ID values when a tuner is selected for use by a CAM or otherwise when a tuner is initiated for receiving a particular TS. In this case, further functions may form part of the steps 368 and 370, namely that at the step 368 the CAM requests an LTS_ID for the selected tuner, and at the step 370 the host replies to the CAM with details of the allocated LTS_ID.

During a period when the housekeeping data or other for non-viewing data is being received at the step 372, any further instances of the step 362 by other CAMs will show that tuner to be in use. Of course, if the user requires use of that tuner, for example to record a programme service, then use by the CAM for non-viewing background reception can be cancelled. This can take place in such a way that the user need not know that the CAM was ever making use of the tuner.

FIG. 16 schematically illustrates the multiplexing of two separate programme services.

Using the techniques described above, a mechanism has been provided to amalgamate selected packets from two or more TSs into a single composite packetized data stream having programme data from two or more of the packetized transport streams received by the tuner arrangement. The packets can be multiplexed together in the right order, which is to say for any individual received TS, the packets appropriate to the required programme service will appear in the composite packetized data stream in the correct order relative to one another. However, the mechanism does not necessarily guarantee that the multiplexed packets appeared in the composite packetized data stream at the correct time positions. At a simple level, this can be a problem when two packets intended to be included in the composite packetized data stream will have overlapping time positions; in the generation of the composite packetized data stream, one of them must be delayed in order to be included in the composite packetized data stream after the other. These time errors can lead to corresponding errors when the audio/video signal represented by the packets is decoded or rendered.

FIG. 16 is a schematic illustration of an example of this potential problem. A subset of packets is selected from each of two transport streams, TS1 and TS2. The selected subset of packets are those packets which are drawn along a time axis running from left to right in the diagram. Unselected packets are simply not illustrated, to assist in the clarity of the diagram. As an example of a timing clash, it can be seen that a packet 400 from TS1 overlaps in time with a packet 402 from TS2.

A third row of FIG. 16 (labelled "to/from module") schematically represents the composite packetized data stream. It will be seen that the packet 400 has substantially retained its original time position, but the packet 402 has been delayed in order to occur, in the composite packetized data stream, after the packet 400.

Fourth and fifth rows of FIG. 16 represent the individual packetized data stream is which are reconstructed after decrypting by the set of CAMs 114 and demultiplexing. Again, it will be seen that the decrypted packet 400' has retained its original time position, where is the decrypted version of the packet 402 (the decrypted packet 402') has undergone a time shift by a shift amount 404. A similar time shift 406 applies to a later packet in TS2.

This change in time positions within transport streams makes the programme clock reference (PCR) timestamps within the packetized data streams no longer accurate. As a result, the receiver clock needed for decoding the MPEG programme service would not be accurate enough and this may cause subjectively disturbing issues such as lip synchronisation errors.

Two possible techniques will be discussed for addressing this problem. FIG. 17 schematically illustrates a packet 410 (which may or may not include a pre-pended header as described above) which also includes an augmented packet header 412 including at least a packet arrival time which represents a timestamp allocated to each TS packet coming from the respective demodulator, or in other words is related to a time at which the composite stream is generated.

FIG. 18 schematically illustrates a packet timing data table which stores similar data, though not in the form of a packet header, allowing the original timing of the TS packets to be regenerated at the final decoder stage. The table may be passed to the CAMs via the control interface or, for example, as DVB private data or as a data table. Such data can be transmitted as a private data packet adjacent in the composite stream to the packet to which it refers. This links the data to the respective packet.

Referring first to FIG. 18 in detail, the packet timing data table comprises five data fields for each TS packet. These are: a sequence number 420 assigned by the host as part of a sequence to each incoming TS packet in a transport stream, a PID value 422 taken from the packet's header, a packet arrival time 424 which represents a timestamp allocated by the host or the CI controller to each TS packet coming from its respective demodulator, a "sent" flag 426 indicating whether the TS packet has been sent to the set of CAMs 114 for decryption, and a "received" flag 428 indicating whether the packet has been received back from the set of CAMs after decryption.

Using the information maintained in the packet timing data table, the CI controller can insert the decrypted packets received back from the set of CAMs 114 at their original time positions according to the packet arrival times stored in the table. Of course, there may be a consistent short delay for all packets in a reconstructed TS (because packets cannot be reinserted into a TS earlier than the time at which they are received back from the set of CAMs), but the relative timings of all the packets in the reconstructed TS can be made correct by use of the arrival time data stored in the packet timing data table.

A similar function can be carried out using the augmented header data 412 shown in FIG. 17.

Figure 19:
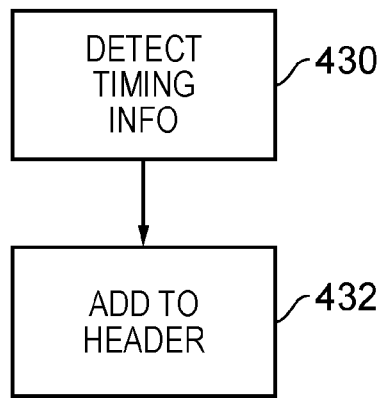
FIG. 19 schematically illustrates the generation of the packet header of FIG. 17.
Figure 20:
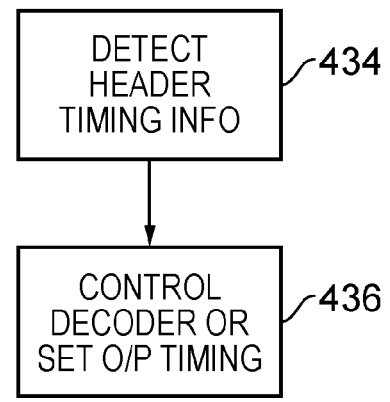
FIG. 20 schematically illustrates the use of the packet header of FIG. 17.

FIG. 19 schematically illustrates the generation of the packet of FIG. 17, and FIG. 20 schematically illustrates the use of the packet of FIG. 17.

Referring to FIG. 19, at a step 430, the CI controller detects a current time when a TS packet arrives at the CI controller, and adds at least the arrival time data to the augmented header 412 at a step 432.

Referring to FIG. 20, when the packet is received back from the set of CAMs after decryption, the CI controller detects the timing information previously inserted into the augmented header 412 at a step 434 and at a step 436 either generates control information to control the decoding of that packet at the correct time or reinserts the packet back into a reconstituted TS at the correct time (or, as described above, at least at the correct relative time with respect to other packets in the reconstituted TS).

Figure 21:
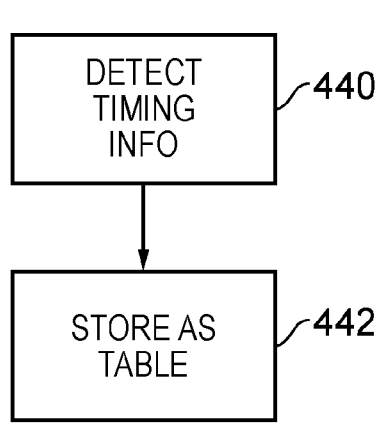
FIG. 21 schematically illustrates the generation of the table of FIG. 18.
Figure 22:
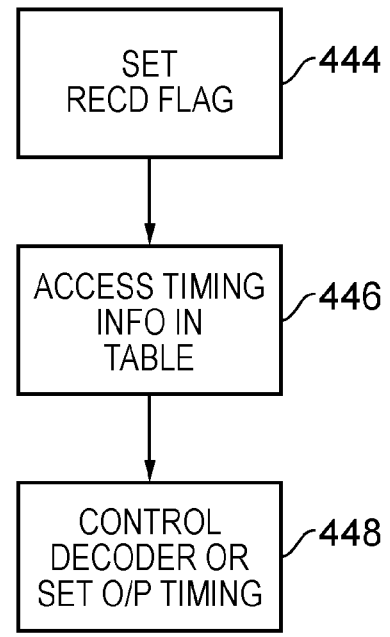
FIG. 22 schematically illustrates the use of the table of FIG. 18.

FIG. 21 schematically illustrates the generation of the table of FIG. 18 and FIG. 22 schematically illustrates the use of the table of FIG. 18.

Referring to FIG. 21, at a step 440, the CI controller detects the arrival time of a TS packet from its respective demodulator, and at a step 442 stores that arrival time as part of a table such as the table shown in FIG. 18, along with a sequence number and the PID extracted from the packet's header. If the CI controller is sending that packet for decryption, the CI controller sets the "sent" flag 426 to indicate that this has taken place.

Referring to FIG. 22, when a packet is received back from the decryption process, the CI controller sets the "received" flag 428 in the table at a step 444, and then, at a step 446 accesses timing information from the arrival time field 424 in the table, using the PID 422 and the sequence number 420 to index the data for the correct packet. Optionally, once a line of data has been accessed for a packet, it can be deleted from the table of FIG. 18 to avoid too great a proliferation of data within the table. As before, at a step 448, the CI controller either controls the decoding process for that packet to be carried out at the correct time or controls the reinsertion of the packet into a reconstituted TS at the correct time or at least the correct relative time with respect to other packets in that reconstituted TS.

It will be understood that some of the techniques described above, such as those relating to the generation of the composite packetized data stream, relate to systems using at least two TSs. Others of the techniques relate to systems using one or more input TSs.

Embodiments of the disclosure also include a data signal, being a signal within the apparatus as described, in particular (though not exclusively) a signal as passed from the host to the CAM or set of CAMs, or the return signal. A storage medium such as a memory by which such a signal is stored is also considered as an embodiment of the disclosure. The storage medium may be, for example, a non-transitory machine-readable storage medium.

Insofar as embodiments of the disclosure have been implemented, at least in part, using the software-controlled data processing apparatus, it will be appreciated that such software, and a medium by which the software is provisioned (such as a non-transitory machine-readable storage medium, for example a magnetic or optical disc or a non-volatile memory) are also considered as embodiments of the present disclosure.

It will be appreciated that methods of operation as described above, as well as apparatus as described above, are considered as embodiments of the present disclosure.

It will be apparent that numerous modifications and variations of the present disclosure are possible in light of the above teachings. It is therefore to be understood that within the scope of the appended claims, the technology may be practiced otherwise than as specifically described herein.

Respective features of embodiments of the invention are defined by the following numbered clauses:

1. An audio/video content receiver for receiving and decoding audio/video data signals modulated onto transmission channels as packetized transport streams, at least one transmission channel carrying non-viewing information, the receiver comprising:
   a tuner arrangement capable of concurrently tuning to two or more transmission channels so as to output two or more respective packetized transport streams;
   a multiplexer configured to generate a composite data signal from received audio/video signals relating to required programmes for decoding, each packetized transport stream being identified in the composite data signal by a local identification value allocated to that packetized transport stream by the content receiver;
   a content decoder capable of concurrently decoding two or more audio/video programmes from the composite data signal;
   a detector configured to detect whether one or more of the transmission channels tuned by the tuner arrangement are not currently in use in respect of providing a programme for decoding;
   a controller, responsive to a detection that a transmission channel is not currently in use, for controlling the tuner to tune that channel to a transmission channel carrying a packetized transport stream including non-viewing information; and
   a non-viewing information decoder for decoding the received non-viewing information, the non-viewing information decoder identifying packets of the non-viewing information, at least in part, by reference to the local identification value associated with the packetized transport stream carrying that non-viewing information.

2. A receiver according to clause 1, in which the tuner arrangement comprises two or more tuners each operable to tune to a single respective transmission channel.

3. A receiver according to clause 1 or clause 2, in which each transmission channel tuned by the tuner arrangement carries encoded audio/video content as a respective packetized transport stream, each transport stream comprising one or more programmes having data packets identified by respective sets of one or more packet identifiers.

4. A receiver according to clause 3, in which the multiplexer is operable to generate a composite packetized data stream having programme data from two or more of the packetized transport streams.

5. A receiver according to any one of the preceding clauses, in which the content decoder comprises a series-connected arrangement of two or more content decoders.

6. A receiver according to any one of the preceding clauses, in which the non-viewing information comprises audio/video data at a data rate lower than a viewing data rate, the non-viewing information decoder comprising a store controller for controlling storage of the non-viewing information for later access.

7. A receiver according to any one of clauses 1 to 5, in which the non-viewing information comprises control information for use by the content decoder.

8. A receiver according to any one of the preceding clauses, comprising an identification generator configured to substitute the local identification value for a packetized transport stream into a packet synchronisation field in each packet of that packetized transport stream.

9. A receiver according to any one of the preceding clauses, in which, at any time, the local identification values are unique with respect to other local identification values allocated by that receiver.

10. A method of operation of an audio/video content receiver for receiving and decoding audio/video data signals modulated onto transmission channels as packetized transport streams, at least one transmission channel carrying non-viewing information, the method comprising:
   concurrently tuning to two or more transmission channels so as to output two or more respective packetized transport streams;
   generating a composite data signal from received audio/video signals relating to required programmes for decoding;
   allocating, at the receiver, a local identification value to each packetized transport stream to identify data from that packetized transport stream in the composite data signal;
   detecting whether one or more of the transmission channels tuned by the tuner arrangement are not currently in use in respect of providing a programme for decoding;
   in response to a detection that a transmission channel is not currently in use, controlling the tuner to tune that channel to a transmission channel carrying a packetized transport stream including non-viewing information;
   identifying packets of the non-viewing information, at least in part, by reference to the local identification value associated with the packetized transport stream carrying that non-viewing information; and
   decoding the received non-viewing information.

11. Computer software which, when executed by a computer, causes the computer to implement the method of clause 10.

12. A storage medium which stores computer software according to clause 11.

The invention claimed is:

1. An audio/video content receiver for receiving and decoding audio/video data signals modulated onto transmission channels as packetized transport streams, at least one transmission channel carrying non-viewing information, the audio/video content receiver comprising:
   a tuner arrangement to concurrently tune to two or more transmission channels so as to output two or more respective packetized transport streams;
   a multiplexer to generate a composite data signal from the output two or more respective packetized transport streams relating to required programs for decoding, each packetized transport stream being identified in the composite data signal by a local identification value allocated to the respective packetized transport stream by the audio/video content receiver;
   a content decoder to concurrently decode two or more audio/video programs from the composite data signal;
   a detector to detect whether one or more tuners of the tuner arrangement are not currently in use in respect of providing a program for decoding for displaying or for recording;
   an interface to
      receive, from a conditional access module (CAM), a query regarding capability of at least one tuner in the tuner arrangement, to tune to a service delivery type, transmit, in response to receiving the query, a reply to the CAM indicating capability information for at least one tuner in the tuner arrangement, indicating capability for the at least one tuner in the tuner arrangement to tune to the service delivery type, and receive, from the CAM in response to the reply, a request to use a service corresponding to the service delivery type, that the at least one tuner in the tuner arrangement is capable to tune, the service carrying non-viewing information;

a controller to, responsive to receiving the request from the CAM, control a tuner to tune to a transmission channel carrying a packetized transport stream including the non-viewing information; and a non-viewing information decoder to decode the non-viewing information, the non-viewing information decoder identifying packets of the non-viewing information based on a local identification value associated with the packetized transport stream carrying the non-viewing information.

2. The receiver according to claim 1, in which the tuner arrangement comprises two or more tuners each operable to tune to a single respective transmission channel.

3. The receiver according to claim 1, in which each transmission channel tuned by the tuner arrangement carries encoded audio/video content as a respective packetized transport stream, each packetized transport stream comprising one or more programs having data packets identified by respective sets of one or more packet identifiers.

4. The receiver according to claim 3, in which the multiplexer is operable to generate a composite packetized data stream having program data from two or more of the packetized transport streams.

5. The receiver according to claim 1, in which the content decoder comprises a series-connected arrangement of two or more content decoders.

6. The receiver according to claim 1, the non-viewing information decoder comprising a store controller for controlling storage of the non-viewing information for later access.

7. The receiver according to claim 1, in which the non-viewing information comprises control information for use by the content decoder.

8. The receiver according to claim 1, further comprising an identification generator to substitute the local identification value for a packetized transport stream into a packet synchronization field in each packet of the packetized transport stream.

9. The receiver according to claim 1, in which, at any time, the local identification values are unique with respect to other local identification values allocated by the receiver.

10. A television set including the audio/video content receiver according to claim 1.

11. A set top box including the audio/video content receiver according to claim 1.

12. The receiver according to claim 1, wherein the capability information includes a descriptor indicating at least one of a terrestrial broadcast delivery system, a satellite broadcast delivery system, and a cable delivery system.

13. A method of operation of an audio/video content receiver for receiving and decoding audio/video data signals modulated onto transmission channels as packetized transport streams, at least one transmission channel carrying non-viewing information, the method comprising:

concurrently tuning, by a tuner arrangement, to two or more transmission channels so as to output two or more respective packetized transport streams;

generating a composite data signal from the output two or more respective packetized transport streams relating to required programs for decoding;

allocating, at the audio/video content receiver, a local identification value to each packetized transport stream to identify data from the respective packetized transport stream in the composite data signal;

detecting whether one or more of tuners of the tuner arrangement are not currently in use in respect of providing a program for decoding for displaying or for recording;

receiving, from a conditional access module (CAM), a query regarding capability of at least one tuner in the tuner arrangement, to tune to a service delivery type;

transmitting, in response to receiving the query, a reply to the CAM indicating capability information for at least one tuner in the tuner arrangement, indicating capability for the at least one tuner in the tuner arrangement to tune to the service delivery type, and receiving, from the CAM in response to the reply, a request to use a service corresponding to the service delivery type, that the at least one tuner in the tuner arrangement is capable to tune, the service carrying non-viewing information;

in response to receiving the request from the CAM, controlling a tuner to tune to a transmission channel carrying a packetized transport stream including the non-viewing information;

identifying packets of the non-viewing information based on a local identification value associated with the packetized transport stream carrying the non-viewing information; and decoding the non-viewing information.

14. A non-transitory computer readable medium including computer program instructions, which when executed by a computer causes the computer to perform the method of claim 13.

15. The method according to claim 13, in which each transmission channel tuned by the tuner arrangement carries encoded audio/video content as a respective packetized transport stream, each packetized transport stream comprising one or more programs having data packets identified by respective sets of one or more packet identifiers.

16. The method according to claim 15, in which the multiplexer is operable to generate a composite packetized data stream having program data from two or more of the packetized transport streams.

17. The method according to claim 13, the decoding comprising controlling storage of the non-viewing information for later access.

18. The method according to claim 13, in which the non-viewing information comprises control information for decoding.

19. The method according to claim 13, further comprising substituting the local identification value for a packetized transport stream into a packet synchronization field in each packet of the packetized transport stream.

20. The method according to claim 13, in which, at any time, the local identification values are unique with respect to other local identification values allocated by the receiver.

* * * * *